United States Patent

Hohmann et al.

[11] 4,104,284
[45] Aug. 1, 1978

[54] NITROANTHRAQUINONES

[75] Inventors: Walter Hohmann, Leverkusen; Helmut Herzog, Bergisch-Neukirchen; Hans-Samuel Bien, Burscheid, all of Fed. Rep. of Germany

[73] Assignee: Bayer Aktiengesellschaft, Leverkusen, Fed. Rep. of Germany

[21] Appl. No.: 695,184

[22] Filed: Jun. 11, 1976

Related U.S. Application Data

[62] Division of Ser. No. 431,710, Jan. 8, 1974, Pat. No. 3,989,450.

[30] Foreign Application Priority Data

Jan. 8, 1973 [DE] Fed. Rep. of Germany ....... 2305916
Jan. 30, 1973 [DE] Fed. Rep. of Germany ....... 2304320

[51] Int. Cl.² ............................................. C07C 97/12
[52] U.S. Cl. .................................................. 260/378
[58] Field of Search ......................................... 260/378

[56] References Cited

U.S. PATENT DOCUMENTS

| 2,727,045 | 12/1955 | McSheehy | 260/378 |
| 3,123,605 | 3/1964 | Teretzky et al. | 260/378 X |
| 3,444,214 | 5/1969 | Buecheler | 260/378 |

Primary Examiner—Paul F. Shaver
Attorney, Agent, or Firm—Plumley and Tyner

[57] ABSTRACT

Process for dyeing and printing synthetic fibre materials using compounds of the formula

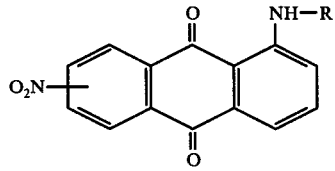

in which
R represents an optionally substituted phenyl radical, as well as special new dyestuffs within the above formula.

3 Claims, No Drawings

NITROANTHRAQUINONES

This is a division of application, Ser. No. 431,710, filed Jan. 8, 1974 now U.S. Pat. No. 3,989,450.

The invention relates to the use of compounds which are free of sulphonic acid groups, of the formula,

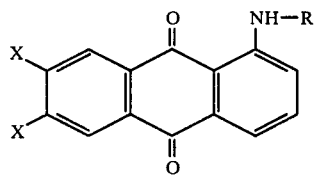

in which
R represents an optionally substituted phenyl radical, one X represents a nitro group and the other X represents hydrogen
or their mixtures, for dyeing and printing synthetic fibre materials.

Suitable substituents on R are alkyl, cycloalkyl, aralkyl, aryl, cycloalkoxy, aralkoxy, aryloxy, alkoxy, alkoxycarbonyl, alkoxycarbonyloxy, acylamino, especially alkylcarbonylamino, alkylsulphonyl, arylsulphonyl, alkylaminocarbonyloxy, acylaminocarbonyloxy, alkylaminocarbonylamino, acylaminocarbonylamino, alkylaminothiocarbonylamino, alkylaminosulphonyloxy, acylaminosulphonyloxy, amino, monoalkylamino and dialkylamino, arylcarbonyloxy, alkylthio, arylthio, alkylsulphonyl, arylsulphonyl, amino, alkylsulphonyloxy, arylsulphonyloxy, alkoxysulphonyl, aryloxysulphonyl, alkoxycarbonyl, alkylaminosulphonyl, aralkylaminosulphonyl, dialkylaminosulphonyl, halogen, such as F, Cl or Br, carboxyl, nitrile, nitro, hydroxyl and cycloalkylamino.

Alkyl as a substituent on R preferably has 1-12 C atoms and can contain further substituents from the above-mentioned group.

The other alkyl and alkoxy groups preferably contain 1-4 C atoms, cycloalkyl and cycloalkoxy groups and in particular these with 5-7 C atoms. The aryl radicals are preferably phenyl radicals. The grops mentioned can be further substituted by amine, hydroxyl, carboxyl, nitrile, halogen or $C_1-C_4$-alkoxy.

As examples of I are . . . . 1-aniline-6- or -7-nitroanthraquinone, 1-[methyl-, 2',6'-dimethyl-, 2',4',6'-trimethyl-, ethyl-, 4'-tert.-butyl-, 4'-dodecyl-, 2'-methyl-6'-ethyl-, 2',4'-dimethyl-6'-ethyl-, chloro-, bromo-, fluoro-, cyano-, methoxy-, ethoxy-, β-hydroxyethoxy-, β-cyanoethoxy-, 3'-chloro-4'-methoxy-, 2'-methyl-4'-methoxy-, 2',5'-diethoxy-, 4'-methylaminomethyl-, 4'-phenyl-, 4'-cyclohexyl-, 2',5'-dimethoxy-, 2'-, 3'- or 4'-dimethylaminomethyl-, 4'-phenoxy-, 4'-methylthio-, 4'-phenylthio-, 3'-(β-hydroxyethylsulphonyl)-, 3'-phenylsulphonyl-, 2'-, 3'- or 4'-amino-, acetylamino-, N-methylacetylamino-, N-cyclohexyl-acetylamino-, hydroxyacetylamino-, methoxyacetylamino-, phenylsulphonyloxy-, methylsulphonyloxy-, phenoxysulphonyl-, ethoxysulphonyl-, 4'-acetylamino-2'-carboxy-, methoxycarbonyl-, acetyl-, phenylcarbonyl-, diethylaminosulphonyl-, N-(β-hydroxyethyl)-N-(β-cyanoethyl)-aminosulphonyl-, N,N-di(β-cyanoethylamino)-sulphonyl-, β-phenylethylaminosulphonyl-, β-hydroxyethoxyethoxy-, γ-hydroxypropoxy-, β-hydroxyethyl-mercapto-, N-(β-hydroxyethylamino)-carbonyl-, β-γ-dihydroxypropoxyphenyl and also methoxy-, cyclohexyloxy-, benzyloxy- and phenoxycarbonylamino-, o-p-propyloxy, o-p-tert.-butyloxy-, o-, p-methoxyethoxy-, 4'- or 5'-chloro-2'-methoxy-, 4',5'-dichloro-2'-methoxy-, 2'-, 3'- or 4'-hydroxy-, 3',5'-dichloro-4'-hydroxy-, 4'-chloro-3'-hydroxy-, 2- or 3'-methoxy-4'-acetylamino]-anilino-6- or -7-nitro-anthraquinones. Also, alkyl-, hydroxy-, alkoxy- and amino-substituted 1-aniline-6,(7)-nitroanthraquinones which are substituted in the aniline radical by one or more phthalimine N-methylene, caprolactam-N-methylene, propionylaminomethylene, succinimidomethylene, benzoylaminomethylene, carbamoylaminomethylene or carbothoxyaminomethylene radicals.

A preferred group of dyestuffs within the formula I corresponds to the formula

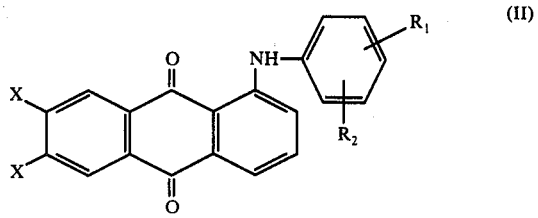

wherein
$R_1$ and $R_2$ independently of one another represent hydrogen, hydroxyl, $C_1-C_4$-alkyl, halogen, $C_1-C_4$-alkoxy, amino or $C_1-C_5$-alkylcarbonylamino and X has the abovementioned meaning.

The alkoxy groups can be substituted further by hydroxyl or $C_1-C_4$-alkoxy.

Particularly preferred compounds of the formula II are those
wherein
$R_1$ denotes hydrogen, chlorine, bromine, hydroxyl, $C_1-C_4$-alkyl or $C_1-C_4$-alkoxy, it being possible for the alkoxy radical to be substituted further by hydroxy or $C_1-C_4$-alkoxy and
$R_2$ denotes hydrogen whilst
X has the abovementioned meaning.

These compounds can be prepared by reacting 1,6- or 1,7-dinotro-anthraquinone with amines of the general formula $$H_2N-R \quad (III)$$

wherein
R has the meaning indicated in the formula I. However, it is technically and economically particularly advatageous to react mixtures of 1,6- and 1,7-dinitroanthraquinone.

A further subject of the invention are anthraquinones which are free of sulphonic acid groups and of carboxylic acid groups, of the formula (1)

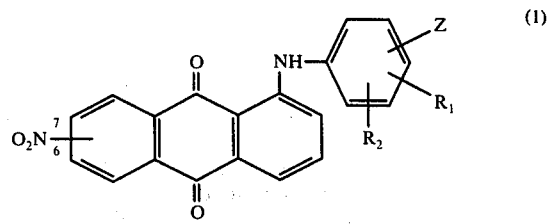

wherein

Z represents phenyl, phenylalkyl, cyclohexyl, halogen, amino, alkylamino, hydroxyl, alkoxy, phenoxy, phenylalkoxy, alkylmercapto, alkylsulphonyl, alkylsulphonyloxy, phenylsulphonyloxy, alkylcarbonyloxy, phenylcarbonyloxy, alkoxycarbonyloxy, alkylcarbonyl, phenylcarbonyl, alkylcarbonylamino, alkoxycarbonylamino, alkylaminocarbonylamino, phenoxysulphonyl, sulphamoyl, alkylsulphonylamino, dialkylaminosulphonyl, carbamoyl or alkylaminosulphonyl and $R_1$ and $R_2$ represent hydrogen, alkyl, alkoxy or halogen and wherein the said aliphatic hydrocarbon radicals preferably possess 1 to 5 C atoms and can optionally be substituted, preferably monosubstituted, by OH, $C_1$–$C_4$-alkoxy, halogen, nitrile or $C_2$–$C_6$-alkylcarbonyloxy and the abovementioned carbocyclic hydrocarbon radicals can be substituted, preferably monosubstituted, disubstituted or trisubstituted, by halogen, $C_1$–$C_5$-alkyl or $C_1$–$C_4$-alkoxy and wherein the nitro group is in the 6- or 7-position, as well as their preparation and use for dyeing synthetic fibre materials.

The substituent Z preferably represents OH, $C_1$–$C_5$-alkoxy, $C_2$–$C_6$-alkylcarbonylamino, sulphamoyl or $C_1$–$C_4$-alkylsulphonylamino.

Furthermore, Z can also represent an alkyl radical with at least two C atoms, preferably a t-butyl radical, or $CF_3$.

By "halogen" there is to be understood, within the scope of the present invention, fluorine, bromine and - preferably - chlorine.

The substituents $R_1$ and $R_2$ preferably represent $C_1$–$C_2$-alkyl or $C_1$–$C_2$-alkoxy which are not substituted further, or chlorine.

The new compounds of the formula (1) can be obtained, for example, by reacting dinitroanthraquinones of the formula (2)

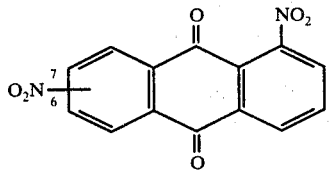

(2)

with anilines of the formula (3)

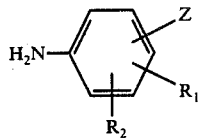

(3)

wherein

Z, $R_1$ and $R_2$ have the abovementioned meaning. This reacton takes place in a manner which is in itself known (compare, for example, German Patent Specification 126,542).

The anilines of the formula (3) are in most cases known or easily obtainable according to known processes.

As examples of (3) there may be mentioned: o-, m- and p-anisidine; o-, m- and p-hydroxyaniline; o-, m- and p-phenetidine and o- and p-propoxyaniline; o- and p-tert.-butoxyaniline; o- and p-(β-hydroxy-ethoxy)aniline; o- and p-(β-methoxy-ethoxy)-aniline; 2,4-dimethoxy-aniline; 2,5-dimethoxy-aniline; 4- or 5-chloro-2-methoxy-aniline; 4,5-dichloro-2-methoxy-aniline; 3,5-dichloro-4-hydroxy-aniline; 4-chloro-3-hydroxy-aniline; 3-chloro-4-methoxy-aniline; 2- or 3-methoxy-4-acetamino-aniline; 4-methyl-3-methoxy-aniline; 2-methyl-3- or -4-methoxy-aniline; 3-methyl-4-hydroxy-aniline; 5-methyl-2-ethoxy-aniline; 2,5-diethoxy-aniline; 2-methoxy-4-chloro-5-methyl-aniline; 2- or 4-(β,γ-dihydroxypropoxy)-aniline; 2- or 4-(β-ethoxy-ethoxy)-aniline; 2-, 3- or 4-chloro-aniline; 2-, 3-, 4-amino-phenol; 4-t-butyl-anialine; 4-cyclohexyl-aniline; m- or p-phenylenediamine; 2-chloro-p-phenylenediamine; 4-chloro-m-phenylenediamine; 1,2,5-toluylenediamine; 1,2,6-toluylenediamine; N-methyl-p-phenylenediamine; N-acetyl-m-phenylenediamine; N-acetyl-p-phenylenediamine; N-methyl-N-acetyl-p-phenylenediamine and N-ethyl-N-acetyl-p-phenylenediamine.

In addition to this direct method of synthesis it is advisable, particularly in cases where the substituent Z is bonded to the phenyl radical A via a O or N atom, to prepare the desired compounds indirectly by, for example, first reacting dinitroanthraquinones (2) with anilines of the formula (3)

wherein

Z represents OH or $NH_2$ and subsequently etherifying or esterifying the free hydroxyl group Z in the reaction product in a manner which is in itself known or acylating the free amino group Z in the reaction product.

Compounds of the formula (1)

wherein

Z represents phenoxysulphonyl or dialkylaminosulphonyl are in addition prepared advantageously by introducing a —$SO_2Cl$ group in a known manner (sulphochlorination) into appropriate compounds of the formula (1) wherein

Z = H and subsequently replacing the chlorine atom in an appropriate maner.

Compounds of the formula (1) with Z = OH can be obtained not only by reaction of dinitroanthraquinones (2) with aminophenols but also from the corresponding alkoxy compounds by ether splitting, the latter being particularly advantageous in the case of ethers in the p-position. The ether splitting can be carried out under acid conditions, for example with aqueous mineral acids, or under alkaline conditions, for example with pyridine/methanol/alkali, but preferably with aqueous $H_2SO_4$, the concentration of which is about 50–96%, preferably about 70–90%.

The requisite temperatures are between 20° and 100° C, preferably between 20° and 50° C. In the case of some ether groups, above all those in the m-position, temperatures above 50° C are required.

Finally, compounds of the formula (1) can be converted into one another by other modifications of the substituent Z, according to methods which are in themselves known, for example by trans-acylation or trans-etherification. Equally, subsequent conversions can be carried out on the remaining non-ionic substituents in the phenylamine ring.

Thus it is possible, for example, to acylate amino groups or saponify acylamino groups, or to introduce halogen atoms (Cl or Br) or nitro groups by halogenation, for example with bromine in $H_2SO_4$ or with $SO_2Cl_2$ in organic solvents, or by nitration with nitric acid or mixtures of nitric acid and sulphuric acid. Sulphuric acid ester groups or sulphamide groups can be introduced by sulphochlorination and subsequent conversion with alcohols or amines. Finally, substituents bonded via methylene bridges, such as, for example, N-methylenecaprolactam or N-methyleneacetamide radicals, can be introduced by reaction with methylene-active compounds (compare British Patent Specification 1,163,956).

However, it is industrially and economically particularly advantageous to react mixtures of 1,6- and 1,7-dinitroanthraquinone with arylamines.

The reaction is carried out in organic solvents at temperatures from 60° to 200° C, preferably at 80°–150° C. Under these conditions the nitro groups in the β-position are not attacked. Possible solvents are high-boiling halogenated or nitrated hydrocarbons, such as dichloroethane and tetrachloroethane, chlorobenzene, o-dichlorobenzene, trichlorobenzene and especially nitrobenzene, or hydrophilic solvents, such as triethanolamine, pyridine, dioxane, dimethylsulphoxide, sulpholane and especially dimethylformamide. It is also advantageous to use an excess of the anilines of the formulae III or (3) as solvents.

To neutralise the nitrous acid which is first split off, it is possible to add acid-binding agents, such as salts of weak inorganic or organic acids, such as the Na, K or Mg salts of carbonic acid or acetic acid, or organic or inorganic bases such as triethanolamine, pyridine, quinoline or magnesium oxide.

The reaction times depend on the nature of the amine to be reacted, on the chosen reaction temperature and on the concentration of the reactants. Depending on the choice of the conditions, the reaction times can vary within wide limits; normally, the reactions are complete after about 4–10 hours.

The reaction products can be isolated in a manner which is in itself known by dilution with low molecular alcohols or by evaporation of the reaction mixtures, preferably in the Venuleth apparatus. If compounds of the formula (3) are used as solvents, the reaction products can also be separated out by dilution with - optionally aqueous - mineral acids or organic acids.

The compounds of the formulae I and (1) are outstandingly suitable for dyeing and printing synthetic fibres, such as cellulose ester fibres, polyamide fibres and above all polyester fibres. Polyester fibres can be dyed in a known manner by the carrier process, high temperature process or thermosol process, or from organic solvents.

The dyeings and prints thus produced are distinguished by good general fastness properties. It is frequently particularly advantageous to employ mixtures of compounds of the formulae I and/or (1), since they substantially surpass the pure components in their tinctorial properties, above all in affinity. Such mixtues can differ in respect of the position of the $NO_2$ group on the anthraquinone nucleus and/or in respect of the nature and/or position of the substituents in the arylamine radical.

The dyestuffs are also outstandingly suitable for use as basic products for brown, navyblue, dark blue and black dyestuff modifications. Thus, for example, fast navyblue polyester dyeings can be produced by combination with commercially availabale blue or blue-green dyestuffs.

Dyestuff mixtures which can be prepared particularly economically are frequently those derived from mixtures of 1,6- and 1,7-dinitro-anthraquinone in which some 1,5- and/or 1,8-dinitro-anthraquinone is still present.

A further subject of the invention are anthraquinones which are free of sulphonic acid groups and carboxylic acid groups, of the formula (4)

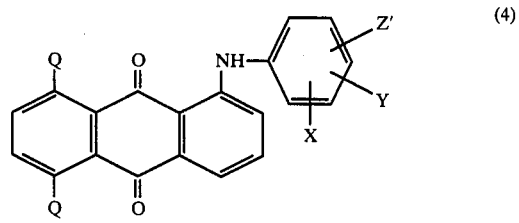

wherein
Z' denotes hydroxyl, alkoxy, alkylmercapto, phenoxy, benzyloxy, cyclohexyl, phenyl, alkylsulphonyl, alkylsulphonyloxy, alkylcarbonyloxy, phenylcarbonyloxy, alkoxycarbonyloxy, alkylcarbonyl, phenylcarbonyl, alkylcarbonylamino, alkoxycarbonylamino, alkylaminocarbonylamino, phenoxysulphonyl, alkylsulphonylamino and dialkylaminosulphonyl,
X and Y denote hydrogen, fluorine, chlorine, bromine, alkyl, alkoxy or alkylcarbonylamino,
one Q denotes a nitro group and
the other Q denotes a hydrogen atom and the above-mentioned alkyl and alkoxy groups preferably have 1–5 C atoms and can be substituted, for example by CN, OH, $C_1$–$C_4$-alkoxy or halogen and the phenyl, benzyl and phenoxy radicals mentioned can be substituted by, for example, halogen and $C_1$–$C_4$-alkyl.

Particularly preferred dyestuffs of the formula (4) are those
wherein
Z' represents hydroxyl, $C_1$–$C_5$-alkoxy or alkylcarbonylamino with 1–5 C atoms in the alkyl radical and X and Y denote hydrogen, chlorine, $C_1$–$C_2$-alkoxy or $C_1$–$C_4$-alkyl.

The new anthraquinones of the formula (4) can be prepared analogously to the compounds of the formula (1).

Frequently, dyestuffs mixtures which can be prepared particularly economically are those derived from 1,5- and 1,8-dinitro-anthraquinone mixtures in which some 1,6- and 1,7-dinitro-anthraquinone may still be present.

The compounds of the formula (4) also largely correspond to the dyestuffs of the formula I or (1) in respect of their possible uses.

EXAMPLE I (a) 10 g of polyethylene terephthalate hank material are dyed for 2 hours at 96°–98° C in a liquor of 400 ml of water, 0.4 g of a mixture of finely divided 1-anilino-6- and -7-nitro-anthraquinone, 3.4 g of a mixture of o-, m- and p-cresotic acid methyl ester and 0.6 g of a mixture of equal parts of an anionic dispersing agent and a non-ionic polyglycol ether, after addition of sulphuric acid until a pH value of 4.5 is reached, and are then rinsed and dried. A deep reddish-tinged violet dyeing is obtained, which has very good fastness to light.

(b) The dyestuff mixture employed in a) can be obtained as follows: 298 g of a mixture of 1,6- and 1,7-dinitroanthraquinone (80.4% strength) are stirred into 900 ml of aniline and the mixture is stirred at 100°–105° C until starting material is no longer detectable in a sample (approx. 8 hours being required); the mixture is then diluted with 900 ml of methanol over the course of 2 hours at 50°–60° C and stirred for a further 2 hours, and the reaction product which has separated out in a crystalline form is filtered off, washed with a solution of 150 g of aniline in 300 ml of methanol and finally with 300 ml of methanol and hot water, and dried at 80° C. 277 g of a mixture of 1-anilino-6- and -7-nitro-anthraquinone are obtained.

(c) The dinitro-anthraquinone employed in b) can be obtained as follows: 10 kg of anthraquinone are dissolved in 40 kg of oleum to give a 20% strength solution, 20.6 kg of a mixture consisting of 33% of $HNO_3$ and 67% of $H_2SO_4$ are added over the course of 2 hours at below 50° C, and the mixture is warmed to 90° C over the course of 2 hours and kept at this temperature until no further anthraquinone and mononitration product are detectable. The mixture is stirred until cold, the 1.5- and 1,8-dinitro-anthraquinone which have separated out are filtered off, and the filter residue is washed in portions with 37 kg of anhydrous sulphuric acid. The liquors which issue (approx. 91 kg) are filtered at 100° C and stirred until they have cooled to 70° C, and 7.8 liters of water are added over the course of approx. 1 hour, as a result of which the temperature rises to 80°–85° C. After a further 30 minutes, the product is filtered off at 80° C and rinsed with 20 kg of 88% strength $H_2SO_4$. After washing until neutral, and drying, 3.3 kg of a product of the following composition are obtained:

| | |
|---|---|
| 1,6-dinitro-anthraquinone | 41.8% |
| 1,7-dinitro-anthraquinone | 38.6% |
| 1,8-dinitro-anthraquinone | 12.0% |
| 1,5-dinitro-anthraquinone | 1.6% |
| 2,6- +2,7-dinitro-anthraquinone | <1.0% |
| hydroxy-dinitro-anthraquinone | 1.2% |

EXAMPLE II (a) 10 g of a polyethylene terephthalate rag are dyed for 2 hours at 120°–130° C in a liquor of pH 4.5 which consists of 400 ml of water, 0.4 g of a very finely divided dyestuff mixture of 1-m-toluidino-6- and -7-nitro-anthraquinone and 0.3 g of a mixture of equal parts of an anionic dispersing agent and a non-ionic polyglycol ether. After rinsing and drying, a deep violet colouration is obtained.

(b) If cellulose triacetate is treated with the same dyestuff mixture in accordance with one of the instructions given in Example Ia) and IIa), violet dyeings are again obtained.

(c) The dyestuff mixture employed in a) and b) can be obtained by reaction of 1,6- and 1,7-dinitro-anthraquinone with m-toluidine analogously to the instruction given in Example Ib.

EXAMPLE III (a) A fabric of polyethylene glycol terephthalate fibers is impregnated on a padder with a liquor which contains, in 1,000 g, 20 g of the finely divided dyestuff 1-(p-tert.-butyl-anilino)-6-nitro-anthraquinone and 10 g of a polyether, described in Belgian Patent Specification 615,102, as a thermosol auxiliary.

The fabric is then squeezed out to a weight increase of 70% and is dried at 80°–120° C in a suspension jet drier or in a drying cabinet. The fabric is then treated in a stenter frame or in a nozzle hot-flue with hot air at 190°–200° C for approx. 45 seconds and is then rinsed, optionally subjected to a reductive after-treatment and dried. The reductive after-treatment for the purpose of removing dyestuff remnants adhering superficially to the fibres can be carried out by introducing the fabric into a liquor at 25° C which contains 3 – 5 $cm^3$/liter of sodium hydroxide solution of 38° Be strength and 1 – 2 g/liter of (concentrated) hydrosulphite, heating the liquor to 70° C over the course of approx. 15 minutes and leaving it to 70° C for a further 10 minutes. The fabric is then rinsed hot, acid-treated with 2 – 3 $cm^3$ of 85% strength formic acid/liter at 50° C, rinsed and dried. A clear violet dyeing is obtained, which is distinguished by good fastness to light, thermofixing, rubbing and washing.

A very similar dyeing is obtained if intead of the polyethylene terephthalate fibres polyester fibres from 1,4-bis-hydroxy-methylcyclohexane and terephthalic acid are used.

(b) The product employed in a) can be obtained as follows: 15 g of 1,6-dinitro-anthraquinone and 30 ml of p-tert.-butyl-aniline are stirred at 125° C until no further dinitroanthraquinone is detectable (approx. 6 hours being required). The warm mixture is diluted with 30 ml of ethylene glycol monomethyl ether, stirred until cold and filtered, and the residue is successively washed with ethylene glycol monomethyl ether and water. 13.9 g of 1-(p-tert.-butyl-anilino)-6-nitro-anthraquinone are obtained.

EXAMPLE IV (a) A previously cleaned and thermofixed fabric of polyethylene terephthalate fibres is printed with a printing paste consisting of the following components: 40 g of a mixture of 1-[m(p)-acetylamino-anilino]-6(7)-nitro-anthraquinone, 475 g of water, 465 g of crystal gum (1.2) and 20 g of sulphonated castor oil.

Instead of crystal gum, an alginate thickener can also be used. To fix the dyestuff, the printed and dried goods are run at 190°–200° C over a high throughput stenter frame or through a condensing apparatus. The period of treatment is about 30–60 seconds.

The resulting fixed print is subsequently rinsed cold, soaped for approx. 10 minutes with 1 – 2 g/liter of anionic detergent at 70°–80° C, rinsed first hot and then cold, and dried. A violet print which is distinguished by good fastness properties is obtained.

(b) The components employed in a) can be obtained from the technical mixture of 1,6- and 1,7-dinitro-anthraquinone (see Example Ic) either by reaction with m- or p-acetylaminoaniline with addition of dimethylformamide at 130°–140° C, or by reaction in excess m- or p-phenylenediamine and subsequent acetylation in pyridine as the solvent.

EXAMPLE V (a) A cellulose triacetate fabric is padded as described in Example IIIa), but using 15 g each of 1-m-anisidino-6(7)-nitro-anthraquinone and 1-p-anisidino-6(7)-nitro-anthraquinone, and is subsequently treated with hot air as described in Example IIIa), but at 210° C. A deep bluish-tinged violet dyeing of very good fastness to light and to sublimation is obtained.

(b) The dyestuffs employed in a) are obtained by reaction of 1,6- and 1,7-dinitro-anthraquinone with m- or p-anisidine either analogously to the instruction given in Example Ia), the reaction with m-anisidine requiring a longer reaction time than that with p-anisidine, or by reacting dinitroanthraquinone in a 2-fold to 3-fold amount of nitrobenzene at 150°–160° C, with addition of 2 mols of anisidine/mol of dinitroanthraquinone.

EXAMPLE VI (a) 100 g of a fabric of texturised polyethylene terephthalate fibres are introduced, without prior cleaning, into a dye bath at room temperature which has been prepared from 1 g of 1-(p-hydroxy-anilino)-6- and -7-nitro-anthraquinone and 1,000 g of tetrachloroethylene. The bath is heated to 115° C over the course of 10 minutes, with vigorous circulation of the liquor, and is kept at this temperature for 30 minutes. The liquor is then separated off and the dyed material is rinsed for 5 minutes with fresh solvent at about 40° C. After separating off the rinsing liquor, the dyed material is centrifuged and dried in a stream of air. A bluish-tinged ruby-coloured dyeing of very good fastness to sublimation and good fastness to washing and rubbing is obtained.

An equivalent dyeing was obtained in the same manner on a fabric of polycyclohexane-dimethylene-terephthalate fibres.

If the tetrachloroethylene is replaced by the same quantity of 1,1,2-trichloroethane, an equivalent dyeing is obtained.

(b) 100 g of acetate filament yarn are introduced at approx. 22° C into a dye bath which is prepared from 1.0 g of the dyestuff used in Example VIa, 1,000.0 g of tetrachloroethylene, 1.5 g of oleic acid ethanolamide, 1.5 g of oleyl alcohol heptaethylene glycol ether and 6.0 g of water. The bath is warmed to 78° C over the course of 20 minutes and is kept at this temperature for 45 minutes. After separating off the dyeing liquor and rinsing with fresh tetrachloroethylene, the dyed material is freed of the adhering solvent by suction filtration and drying in a stream of air. A bluish-tinged ruby-coloured dyeing is obtained.

(c) The dyestuff mixture employed in a) and b) can be obtained in quantitative yield from 1-p-anisidino-6(7)-nitro-anthraquinone by ether splitting in 10 g of 78 – 80% strength $H_2SO_4$ at 40° C (approx. 6 hours being required).

If polyethylene terephthalate fibres or cellulose triacetate fibres are dyed or printed in accordance with one of the instructions described in Examples I – VI with the dyestuffs of the formula

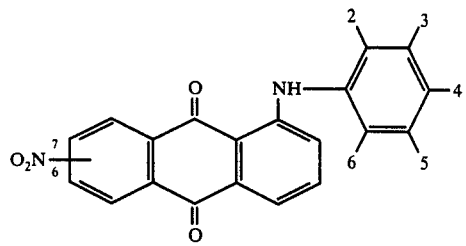

listed in the table strongly reddish-tinged to weakly bluish-tinged violet dyeings or prints are obtained. In the first column, the figures 6 or 7 denote that the pure dyestuff of which the nitro group is in the indicated position was used for dyeing, whilst 6,7 indicate that a dyestuff mixture was employed.

Table A

| Position of $NO_2$ | Substituent in | | | | |
|---|---|---|---|---|---|
| | 2 | 3 | 4 | 5 | 6 |
| 6 | H | H | H | H | H |
| 6,7 | $CH_3$ | H | H | H | H |
| 7 | H | $CH_3$ | H | H | H |
| 6 | H | H | $CH_3$ | H | H |
| 6,7 | H | H | $CH_3$ | H | H |
| 6 | $CH_3$ | H | H | H | $CH_3$ |
| 6,7 | $CH_3$ | H | $CH_3$ | H | $CH_3$ |
| 7 | C—$(CH_3)_3$ | H | $CH_3$ | H | H |
| 6,7 | H | Cl | H | H | H |
| 6,7 | H | H | Cl | H | H |
| 6,7 | H | Cl | Cl | H | H |
| 6,7 | H | H | N—CO—$CH_3$ \| $CH_3$ | H | H |
| 6 | H | —NH—CO—$CH_3$ | H | H | H |
| 6,7 | H | H | ⬡ (cyclohexyl) | H | H |
| 6,7 | H | Br | H | H | H |
| 6 | H | $NH_2$ | H | H | H |
| 6 | $CH_3$ | H | —$CH_2$—N(azepan-2-one) | H | H |
| 6 | $CH_3$ | $SO_2NH_2$ | $C_2H_5$ | H | $CH_3$ |
| 7 | $SO_2$—NH—$CH_3$ | H | $CH_3$ | H | H |
| 6,7 | H | H | —O—⬡ (phenoxy) | H | H |

Table A-continued

| Position of NO$_2$ | 2 | 3 | Substituent in 4 | 5 | 6 |
|---|---|---|---|---|---|
| 6,7 | H | H | -S-C$_6$H$_5$ | H | H |
| 6 | H | H | NH-CO-CH(CH$_3$)(C$_2$H$_5$) with -S-C$_6$H$_4$-CH$_3$ | H | H |
| 7 | H | H | S-CH$_2$-CH$_2$-OH | H | H |
| 6 | H | CN | H | H | H |
| 6 | H | H | OH, NH-CO-CH$_2$ | H | H |
| 6 | CH$_2$ | H | H | N(C$_2$H$_5$)-CO-CH$_3$ | H |
| 7 | H | H | -S-CH$_3$ | H | H |
| 7 | SO$_2$-O-CH$_3$ | H | CH$_3$ | H | H |
| 6,7 | H | CH$_3$ | Cl | H | H |
| 7 | H | CF$_3$ | H | H | H |
| 6,7 | H | H | C$_2$H$_5$ | H | H |
| 6,7 | H | CH$_3$ | H | CH$_3$ | H |
| 6 | H | H | C$_{12}$H$_{25}$ | H | H |
| 6 | H | H | NH-CH$_3$ | H | H |
| 6,7 | H | H | NH-C$_6$H$_4$-CH$_3$ | H | H |
| 6,7 | H | NH-CO-CH$_3$ | CH$_3$ | H | H |
| 6,7 | H | H | -C$_6$H$_5$ | H | H |
| 6,7 | OCH$_3$ | H | H | H | H |
| 7 | OCH$_3$ | H | H | H | H |
| 6,7 | H | OCH$_3$ | H | H | H |
| 6,7 | H | H | OH | H | H |
| 7 | H | OH | H | H | H |
| 6,7 | -O-CH$_2$-CH$_2$-OH | H | H | H | H |
| 6,7 | H | H | OC$_2$H$_5$ | H | H |
| 6 | H | H | OC$_3$H$_7$ | H | H |
| 6,7 | OCH$_3$ | H | H | OCH$_3$ | H |
| 6 | H | OH | Cl | H | H |
| 7 | H | Cl | OH | Cl | H |
| 6,7 | CH$_3$ | H | OCH$_3$ | H | H |
| 6,7 | OC$_2$H$_5$ | H | H | CH$_3$ | H |
| 6 | OCH$_3$ | H | Cl | OCH$_3$ | H |
| 6,7 | OCH$_3$ | H | Cl | CH$_3$ | H |
| 6,7 | OCH$_3$ | H | NH-COCH$_3$ | H | H |
| 6,7 | OC$_2$H$_5$ | H | H | OC$_2$H$_5$ | H |
| 7 | O-(C$_2$H$_4$O)$_2$CH$_3$ | H | H | H | H |

EXAMPLE I (a) 298 g of a mixture of 1,6- and 1,7-dinitro-anthraquinone (80.4% strength) are stirred into 900 g of fused p-anisidine and the mixture is stirred at 100°–105° C until no further starting material is detectable in a sample (approx. 8 hours being required); the mixture is diluted with 900 ml of methanol over the course of 2 hours at 50°–60° C, stirred overnight until cold, diluted with a further 900 ml of methanol over the course of 3 hours and stirred for a further 2 hours, and the reaction product which has separated out in a crystalline form is filtered off, washed with a solution of 150 g of p-anisidine in 300 ml of methanol and finally with 300 ml of methanol and hot water and dried at 80° C.

312 g of a mixture of 1-p-anisidino-6- and -7-nitroanthraquinone are obtained.

(b) The dinitroanthraquinone employed in a) can be obtained as follows: 10 kg of anthraquinone are dissolved in 40 kg of 20% strength oleum, 20.6 kg of a fixed acid consisting of 33% of HNO$_3$ and 67% of H$_2$SO$_4$ are added over the course of 2 hours at below 50° C, and the mixture is warmed to 90° C over the course of 2 hours and kept at this temperature until anthraquinone and mononitration product are no longer detectable. The mixture is stirred until cold, the 1,5- + 1,8- dinitro-anthraquinone which have separated out are filtered off and the material on the filter is washed with 37 kg of anhydrous sulphuric acid in portions. The issuing liquors (approx. 91 kg) are filtered at 100° C, and stirred until they have cooled to 70° C, and 7.8 litres of water are added over the course of approx. 1 hour, as a result of which the temperature rises to 80°–85° C. After a further 30 minutes, the product is filtered off at 80° C and rinsed with 20 kg of 88% strength H$_2$SO$_4$. After washing until neutral, and drying, 3.3 kg of a product of the following composition are obtained:

| | |
|---|---|
| 1,6-dinitro-anthraquinone | 41.8% |
| 1,7-dinitro-anthraquinone | 38.6% |
| 1,8-dinitro-anthraquinone | 12.0% |
| 1,5-dinitro-anthraquinone | 1.6% |
| 2,6- +2,7-dinitro-anthraquinone | <1.0% |
| hydroxy-dinitro-anthraquinone | 1.2% |

EXAMPLE 2

(a) 312 g of the product obtained according to Example 1a) are dissolved in 3,120 g of 78% strength sulphuric acid and the solution is warmed to 40° C until less than 5% of starting material are detectable in a sample (approx. 5 hours being required). The melt is stirred into 12 liters of cold water, the mixture is warmed to 50° – 55° C and the precipitate is filtered off, washed with warm water until neutral, and dried. 300 g of a mixture of 1-(p-hydroxy-anilino)-6-nitro-anthraquinone and the corresponding 7-nitro compound are obtained.

(b) The same product can also be obtained if 1,6- and 1,7-dinitro-anthraquinone are reacted with p-aminophenol at 9° – 100° C, with addition of dimethylformamide as the solvent.

EXAMPLE 3

The procedure described in Example 2a) is followed but the reaction is stopped when approx. 50% of the starting material are still present. After working up in the same way, 307 g of a mixture of 1-(p-hydroxyanilino)-6- and -7-nitro-anthraquinone and 1-p-anisidino-6- and -7-nitro-anthraquinone are obtained.

EXAMPLE 4

(a) 20 g of a mixture of 1,6— + 1,7-dinitro-anthraquinone and 60 g of p-(hydroxy-ethoxy)-aniline are warmed for 4 hours at 100° – 105° C and finally to 120° – 125° C until the dinitro-anthraquinones have disappeared (approx. 2 hours being required), the mixture is diluted with 60 ml of methanol and stirred further at room temperature until oily constituents are no longer present and the precipitate is filtered off, washed with a mixture of equal parts of p-(hydroxy-ethoxy)-aniline and methanol and finally with methanol and water. 16.1 g of a mixture of 1-[p-(β-hydroxy-ethoxy)-aniline]-6- and -7-nitro-anthraquinone are obtained.

(b) A similar mixture of 1-[p-(β-methoxy-ethoxy)-aniline]-6- and -7-nitro-anthraquinone is obtained if in a), instead of p-(hydroxy-ethoxy)-aniline the same quantity of p-(methoxyethoxy)-aniline is employed.

EXAMPLE 5

50 g of a mixture of 1,6- and 1,7-dinitro-anthraquinone and 150 g of 2,4-dimethoxy-aniline are stirred for 6 hours at 95°–100° C; this mixture is diluted with 150 ml of ethylene glycol monomethyl ether and the product is filtered off and washed with methanol and water. 37.3 g of 1-(2',4'-dimethoxy-aniline)-6- and -7-nitro-anthraquinone are obtained.

EXAMPLE 6

10 g of 1,6- and 1,7-dinitro-anthraquinone (mixture) in 30 ml of nitrobenzene are stirred with 8.2 g of p-anisidine and 4.25 g of potassium acetate at 150° C until only traces of dinitro-anthraquinone remain detectable, the mixture is stirred overnight until cold and the product which has crystallised in needles is filtered off and washed successively with a little nitrobenzene, methanol and water. 5.4 g of pure 1-p-anisidino-6- and -7-nitro-anthraquinone are obtained.

EXAMPLE 7

100 g of 1,6-dinitro-anthraquinone and 84 g of p-anisidine are stirred in 300 ml of nitrobenzene at 150° C until no further starting material is detectable in a sample. The mixture is now distilled to dryness in a Venuleth apparatus under a vacuum of 5 mm and the finely ground residue is thoroughly stirred with dilute sulphuric acid, filtered off, washed until neutral and dried. 125 g of 1-p-anisidino-6-nitro-anthraquinone are obtained.

EXAMPLE 8

50 g of 1,7-dinitro-anthraquinone and 150 ml of o-anisidine are stirred for 9 hours at 120° – 125° C and then diluted with 150 ml of ethylene glycol monomethyl ether, the mixture is stirred until cold and stirred for several hours longer in an ice bath, and the product is filtered off and successively washed with a little ethylene glycol monomethyl ether, methanol and water. 40.4 g of 1-o-anisidino-7-nitro-anthraquinone are obtained.

EXAMPLE 9

(a) 298 g of a dinitro-anthraquinone mixture containing 30.4% of 1,6-, 28.7% of 1,7- and 28.3% of 1,8-dinitro-anthraquinone, are stirred into 900 g of fused p-anisidine and the mixture is stirred at 100° – 105° C until no further starting material is detectable in a sample (approx. 8 hours being required); the mixture is diluted with 450 ml of methanol over the course of 2 hours at 50° – 60° C and is stirred for 18 hours until cold, diluted with a further 450 ml of methanol over the course of 3 hours and stirred for a further 18 hours, and the reaction product which has separated out in a crystalline form is filtered off, washed with a solution of 150 g of p-anisidine in 300 ml of methanol and finally with 300 ml of methanol and hot water, and dried at 80° C.

308 g of a mixture of 1-p-anisidino-6-, -7- and -8-nitro-anthraquinone are obtained.

(b) If the procedure indicated above is followed but a dinitro-anthraquinone mixture of the following composition is employed: 51.6% of 1,8-, 10.41 % of 1,5-, 15.8% of 1,6- and 16.6% of 1,7-dinitro-anthraquinone, 302 g of a mixture consisting of 1-p-anisidino-6-, -7- and -8-nitro-anthraquinone are obtained.

Saponification of this product analogously to Example 2a gives a mixture of 1-(4'-hydroxy-anilino)-6-, -7- and -8-nitro-anthraquinone.

EXAMPLE 10

10 g of p-toluenesulphonyl chloride are added over the course of 15 minutes to 15 g of a mixture of 1-(4'-hydroxy-anilino)-6- and -7-nitro-anthraquinone, obtained according to Example 2a, in 75 ml of pyridine, at room temperature. 7 ml of triethylamine are then added dropwise whilst cooling with ice and the reaction is then stirred at room temperature until no further starting material is present. After adding 75 ml of methanol, the product which has separated out is filtered off, washed successively with 30 ml of 1:1 pyridine/methanol, methanol and water and dried in vacuo at 60° C.

14 g of a mixture of 1-(4'-toluenesulphonyloxy-anilino)-6- and -7-nitro-anthraquinone are obtained.

If the procedure indicated above is followed but the tosyl chloride is replaced by mesyl chloride, a mixture of 1-(4'-methanesulphonyloxy-anilino)-6- and -7-nitro-anthraquinone is obtained in good yield.

EXAMPLE 11

15 g of a mixture of 1-(3'-amino-anilino)-6- and -7-nitro-anthraquinone, obtained according to Example 17a), 150 ml of pyridine and 7.5 ml of methanesulphochloride are briefly heated under reflux until, according to thin layer chromatography, no further starting material is present. After cooling to 60° C, 150 ml of methanol are added and the product is filtered off at room temperature, washed successively with a little 1:1 pyridine/methanol, methanol and water, and dried.

10 g of a mixture of 1-(3'-methylaminosulphonylanilino)-6- and -7-nitro-anthraquinone are obtained.

If the procedure indicated is followed but the mesyl chloride is replaced by tosyl chloride, 12 g of a mixture of 1-(3'-tolylsulphamoyl-anilino)-6- and -7-nitro-anthraquinone are obtained.

EXAMPLE 12

15 g of chloroformic acid ethyl ester are added over the course of 30 minutes, at room temperature, to a solution of 15 g of a mixture of 1-(4'-amino-anilino)-6- and -7-nitro-anthraquinone, obtained analogously to Example 17a), in 150 ml of N-methylpyrrolidone. The mixture is stirred further at room temperature until no further starting material is present. After diluting the reaction mixture with 150 ml of methanol, the product is filtered off, washed successively with a little 1:1 N-methylpyrrolidone/methanol, methanol and water, and dried.

16 g of a mixture of 1-(4'-ethoxy-carbonylamino-anilino)-6- and -7-nitro-anthraquinone are obtained.

EXAMPLE 13

5 ml of chloroformic acid ethyl ester are added dropwise, at room temperature, to a solution of 10 g of a mixture of 1-(4'-hydroxy-anilino)-6- and -7-nitro-anthraquinone in 100 ml of N-methylpyrrolidone. 4 ml of triethylamine are then added dropwise, whilst cooling, and the mixture is then stirred further, at room temperature, until only traces of starting material are still detectable chromatographically. After working up with methanol, 8 g of a mixture of 1-(4'-ethoxycarbonyloxy-anilino)-6- and -7-nitro-anthraquinone are obtained

EXAMPLE 14

8 ml of acetyl chloride are added dropwise at room temperature, over the course of 15 minutes, to a solution of 15 g of a mixture of 1-(3'-methylamino-anilino)-6- and -7-nitro-anthraquinone (obtained analogously to Example 17a from 1,6/1,7-dinitro-anthraquinone and N-methyl-m-phenylenediamine) and 150 ml of N-methylpyrrolidone and the mixture is warmed to 60° C and kept at this temperature, whilst stirring well, until no further starting material is detectable according to a chromatogram. After dilution with 150 ml of methanol, the product is filtered off whilst cold, successively washed with a little 1:1 N-methylpyrrolidone/methanol, methanol and water, and dried at 80° C.

12 g of a mixture of 1-(3'-N-methyl-N-acetylaminoanilino)-6- and -7-nitro-anthraquinone are obtained.

EXAMPLE 15

10 g of a mixture of 1-p-toluidino-7- and -7-nitro-anthraquinone (obtained analogously to Example 1a) are introduced into a mixture of 50 g of chlorosulphonic acid and 5 g of thionyl chloride at 0° – 5° C. The mixture is then heated to 50° C over the course of 1 hour and kept at this temperature for 1.5 hours. After cooling to room temperature, it is poured into ice water and the product is filtered off and washed with cold water until neutral (40 g of moist filter cake).

The moist sulphochloride is introduced into a mixture of 100 g of acetone, 5 g of triethylamine and 10 g of phenol at room temperature and heated to the reflux temperature (duration: several hours). After completion of the reaction, the product is filtered off whilst cold, washed successively with acetone and water, and dried.

12 g of a mixture of 1-(4'-methyl-2'-phenoxysulphonyl-anilino)-6- and -7-nitro-anthraquinone are obtained.

EXAMPLE 16

(a) 15 g of moist sulphochloride press cake, obtained according to Example 15, are introduced into 50 ml of 3-methoxypropylamine whilst cooling and the mixture is kept at room temperature, whilst stirring, until complete reaction has occurred. 100 ml of methanol and 20 ml of water are now added and the product is filtered off and washed successively with methanol/water and water. After drying, 5 g of a mixture of 1-[4'-methyl-2'-(3''-methoxypropylaminosulphonyl)-anilino]-6- and -7-nitro-anthraquinone are obtained.

(b) If the indicated procedure is followed but the 3-methoxypropylamine is replaced by 70 ml of 40–50% strength aqueous dimethylamine solution (working up: pouring into ice water), 4 g of a mixture of 1-(4'-methyl-2'-dimethylamino-sulphonylanilino)-6- and -7-nitro-anthraquinone are obtained.

EXAMPLE 17

(a) 15 g of 1,6- and 1,7-dinitro-anthraquinone are stirred with 45 g of m-phenylenediamine at 100° – 105° C until no further starting material is detectable in a sample which is withdrawn; 45 ml of glacial acetic acid are now added, the mixture is stirred until cold, 50 ml of water are added dropwise and the precipitate is filtered off and washed successively with 50% strength acetic acid and water.

11.8 g of a mixture of 1-(m-amino-anilino)-6- and -7-nitro-anthraquinone are obtained.

(b) 7.5 g of the product obtained in a) are dissolved in 70 ml of acetic anhydride at 30° – 40° C and the solution is stirred until no further starting material is detectable chromatographically. The melt is slowly stirred into 1 liter of ice water and is further stirred until all the acetic anhydride has been hydrolysed. The product is filtered off, washed until neutral and dried. 8.3 g of a mixture of 1-(m-acetylamino-anilino)-6- and -7-nitro-anthraquinone are obtained.

(c) If the procedure described in b) is followed but the mixture, instead of being poured into ice water, is diluted with 90 ml of methanol whilst cooling with ice and the product is filtered off and washed with a little glacial acetic acid and finally with methanol, 6.2 g are obtained.

EXAMPLE 18

15 g of a mixture of 1,6- and 1,7-dinitro-anthraquinone, 30 ml of dimethylformamide and 45 g of p-aminoacetanilide are stirred at 140° C until only a little dinitro-anthraquinone remains detectable (approx. 1 hour being required). 75 ml of methanol are now added dropwise from when the temperature has dropped to 80° and the mixture is stirred until cold and then for several hours more at room temperature. The reaction product which has separated out is filtered off and washed with 40 ml of a mixture of 2 parts by volume of methanol and 1 part by volume of dimethylformamide and finally with water. A mixture of 1-(p-acetylamino-anilino)-6- and -7-nitro-anthraquinone is obtained.

Using one of the methods described in Examples 1–18, it is possible to obtain, from 1,6- or 1,7-dinitro-anthraquinone or their mixture, the dyestuffs of the formula

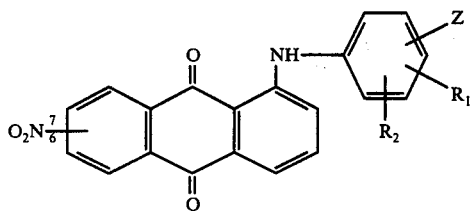

listed in Table B, which dye polyester fibers, in accordance with one of the instructions given in Examples 24 and 25, in the shades indicated in the last column of the table. The figures 6 or 7 in the first column denote that a pure dyestuff is concerned whilst 6,7 indicates that a corresponding dyestuff mixture is involved. In columns Z, $R_1$ and $R_2$, the figures in brackets indicate the position of the substituent on the phenyl radical.

starting material is present, according to thin layer chromatography. The mixture is diluted with 150 ml of methanol over the course of 30 minutes at 50° – 60° C and is stirred overnight until cold and the reaction product is filtered off, washed with a solution of 30 g of p-anisidine in 30 ml of methanol and finally with 200 ml of methanol and hot water, and dried at 80° C. 51 g of 1-p-anisidino-8-nitro-anthraquinone are obtained.

The 1,8-dinitro-anthraquinone employed in this example can be manufactured according to methods which are in themselves known, compare, for example, Belgian Patent Specification 788,016.

EXAMPLE 20

(a) 12 g of the product obtained according to Example 19) are dissolved in 120 ml of 78% strength sulphuric acid and the solution is warmed to 50° – 60° C Table B

| Position of the $NO_2$ group | Z | $R_1$ | $R_2$ | Colour shade |
|---|---|---|---|---|
| 6,7 | $CCH_3$ (2) | H | H | Violet |
| 7 | $OCH_3$ (4) | H | H | " |
| 6 | $OCH_3$ (2) | H | H | " |
| 6 | $OCH_3$ (3) | H | H | Strongly reddish-tinged violet |
| 6,7 | $OCH_3$ (3) | H | H | " |
| 6,7 | OH (2) | H | H | Bluish-tinged violet |
| 6,7 | OH (3) | H | H | Reddish-tinged violet |
| 6 | OH (4) | H | H | Violet |
| 7 | OH (4) | H | H | " |
| 6,7 | $OCH_2$—$CH_2$—OH (2) | H | H | " |
| 7 | $OCH_2$—CH—$CH_2OH$ (4)<br>           \|<br>          OH | H | H | " |
| 6 | $OCH_2$—$CH_2$—$OCH_3$ (4) | H | H | " |
| 6,7 | $OC_2H_5$ (4) | H | H | " |
| 6,7 | $OC_2H_5$ (3) | H | H | " |
| 7 | $OC_2H_5$ (2) | H | H | " |
| 6 | $OC_3H_7$ (4) | H | H | " |
| 6,7 | $OCH_3$ (2) | $OCH_3$ (5) | H | " |
| 6,7 | $OCH_3$ (2) | Cl (5) | H | " |
| 6 | OH (3) | Cl (4) | H | " |
| 7 | OH (4) | Cl (3) | Cl (5) | " |
| 6,7 | $OCH_3$ (4) | $CH_3$ (2) | H | " |
| 6,7 | $OC_2H_5$ (2) | $CH_3$ (5) | H | " |
| 6 | $OCH_3$ (2) | $OCH_3$ (5) | Cl (4) | " |
| 6,7 | $OCH_3$ (2) | Cl (4) | $CH_3$ (5) | " |
| 6,7 | $OCH_3$ (2) | NH—$COCH_3$ (4) | H | " |
| 6,7 | $OC_2H_5$ (2) | $OC_2H_5$ (5) | H | " |
| 7 | $O(CH_2$—$CH_2$—$O)_2CH_3$ (2) | H | H | " |
| 6,7 | Cl (4) | H | H | " |
| 6,7 | $\quad CH_3$<br>$\quad \|$<br>—C—$CH_3$ (4)<br>$\quad \|$<br>$\quad CH_3$ | H | H | " |
| 6 | ⌬ (4) | H | H | " |
| 7 | NH—$SO_2$—$CH_3$ (4) | Cl (2) | H | " |
| 6,7 | NH—$SO_2$—⌬—$CH_3$ (4) | Cl (2) | H | " |
| 6,7 | NH—CO—$OCH_3$ (3) | H | H | " |
| 6,7 | O—CO—$OCH_3$ (4) | H | H | " |
| 6,7 | $C_2H_5$<br>$\|$<br>N—CO—$CH_3$ (4) | H | H | " |
| 6,7 | NH—$SO_2$—$NH_2$ (2) | $CH_3$ (4) | H | " |
| 6,7 | $\qquad\qquad C_2H_5$ (2)<br>NH—$SO_2$—N<br>$\qquad\qquad C_2H_5$ | $CH_3$ (4) | H | " |
| 6,7 | S—$CH_2$—$CH_2$—OH (4) | H | H | " |
| 6,7 | NH—CO—NH—$CH_3$ (3) | H | H | " |

EXAMPLE 19

A mixture of 50 g. of 1,8-dinitro-anthraquinone (82% strength), 150 g of p-anisidine and 21.5 g of anhydrous potassium acetate is heated at 95° – 100° C (duration approx. 5 hours), with vigorous stirring, until no further until less than 5% of starting material are detectable in a sample (approx. 3 hours being required). The melt is stirred into 800 ml of cold water and warmed to 50° – 55° C and the precipitate is filtered off, washed with warm water until neutral and dried. 10.5 g of 1-(p-hydroxy-anilino)-8-nitro-anthraquinone are obtained.

(b) The same product can also be obtained when 1,8-dinitro-anthraquinone is reacted with p-aminophenol at 90° – 105° C, dimethylformamide being added as the solvent.

EXAMPLE 21

The procedure described in Example 20a) is followed but the reaction is already stopped when approx. 50% of the starting material are still present. After working up in the same way, 10 g of a mixture of 1-(p-hydroxyanilino)-8-nitro-anthraquinone and 1-p-anisidino-8-nitro-anthraquinone are obtained.

EXAMPLE 22

(a) 15 g of p-anisidine are introduced over the course of 1 hour into a suspension of 25 g of 1,5-dinitro-anthraquinone (approx. 95% strength) in 100 ml of nitrobenzene at 180° – 190° C (conversion about 50%).

The mixture is then cooled to 100° – 120° C and the product is filtered off hot and successively washed with a little hot nitrobenzene, methanol and water. Approx. 9.5 g of unreacted 1,5-dinitro-anthraquinone are obtained.

On addition of 200 ml of methanol to the nitrobenzene filtrate, whilst stirring in an ice bath, and working up in the customary way, 10 g of 1-p-anisidino-5-nitro-anthraquinone are obtained.

(b) 10 g of the product obtained according to Example 22a are introduced into 120 ml of 78% strength sulphuric acid and the suspension is warmed to 50° – 60° C until only traces of starting material remain present according to a thin layer chromatogram (duration approx. 7 hours). After working up as indicated in Example 20, 9 g of 1-(p-hydroxy-anilino)-5-nitro-anthraquinone are obtained.

EXAMPLE 23

298 g of a dinitro-anthraquinone mixture containing 37.3% of 1,5-, 33.6% of 1,8-, 11.2% of 1,6- and 12.4% of 1,7-dinitro-anthraquinone, are stirred into 900 g of fused p-anisidine and the mixture is stirred for about 6 hours at 100°–105° C until according to a chromatogram, only traces of starting material remain detectable; the mixture is diluted with 450 ml of methanol over the course of 2 hours at 50° – 60° C, stirred for 18 hours until cold, diluted with a further 450 ml of methanol over the course of 3 hours and stirred for a further 18 hours, and the reaction product is filtered off and washed with a solution of 75 g of p-anisidine in 150 ml of methanol and finally with 300 ml of methanol and hot water. After thorough stirring of the residue with dilute HCl, the product is filtered off, washed until neutral and dried at 80° C. 276 g, consisting of 1-p-anisidino-5-, -6-, -7- and -8-nitro-anthraquinone, contaminated with 1,5-dinitroanthraquinone and 1,5- and 1,8-dianisidino-anthraquinone (together amounting to approx. 10%) are obtained. Saponification of this product analogously to Example 2a gives a mixture of 1-p-hydroxyanilino-5-, -6-, -7- and -8-nitroanthraquinone.

Using one of the methods described in Examples 1 – 23, it is possible to obtain, from 1,5- or 1,8-dinitroanthraquinone, or their mixture, the dyestuffs of the formula

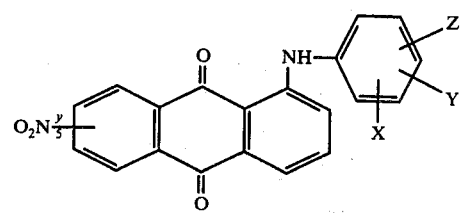

listed in the table, which dye polyester fibres, according to one of the instructions given in Examples 24 and 25, in the shades indicated in the last column of the table. The figures 5 or 8 in the first column indicate that a pure dyestuff is concerned whilst 5,8 denotes that a corresponding dyestuff mixture is involved. In columns X and Y, the figures in brackets indicate the position of the substituent on the phenyl radical.

Table C

| Position of the NO₂ group | Z | X | Y | Colour shade |
| --- | --- | --- | --- | --- |
| 8 | OCH₃ (2) | H | H | Violet |
| 5,8 | OCH₃ (3) | H | H | " |
| 5 | OCH₃ (3) | H | H | " |
| 5,8 | OCH₃ (2) | OCH₃ (4) | H | " |
| 5,8 | OCH₃ (2) | OCH₃ (5) | H | " |
| 8 | OC₂H₅ (2) | OC₂H₅ (4) | H | " |
| 5,8 | OH (4) | H | H | " |
| 5,8 | OH (3) | H | H | " |
| 5.8 | OH (2) | H | H | " |
| 8 | OCH₂—CH₂—OCH₃(4) | H | H | " |
| 8 | OH (4) | Cl (3) | H | " |
| 5 | OH (3) | Cl (4) | H | " |
| 8 | OC₃H₇ (4) | H | H | " |
| 8 | NH—CO—CH₃ (3) | H | H | " |
| 5 | CH₃<br>\|<br>N—CO—CH₃ (4) | H | H | " |
| 5,8 | NH—SO₂—⟨⟩—CH₃ (4) | H | H | " |
| 8 | NH—SO₂—CH₃ (3) | H | H | " |
| 8 | NH—SO₂—N(CH₃)₂ (4) | H | H | " |
| 5 | NH—SO₂—N(CH₃)₂ (3) | H | H | " |

Table C-continued

| Position of the NO₂ group | Z | X | Y | Colour shade |
|---|---|---|---|---|
| 8 | NH—CO—NHC₂H₅ (4) | H | H | " |
| 5,8 | NH—CO—OC₂H₅ (4) | H | H | " |
| 8 | O—SO₂—C₂H₅ (3) | H | H | " |
| 5 | O—SO₂—⟨C₆H₄⟩—CH₃ (3) | H | H | " |
| 5,8 | O—CO—OCH₃ (4) | H | H | " |
| 8 | S—CH₂—CH₂—OH (4) | H | H | " |
| 5,8 | SO₂—O—⟨C₆H₅⟩ (2) | CH₃ (4) | H | " |
| 5,8 | SO₂—NH—CH₂—CH₂—CH₂—OCH₃ (3) | OCH₃ (4) | H | " |

EXAMPLE 24

(a) 10 g of polyethylene terephthalate hank material are dyed for 2 hours at 96° – 98° C in a liquor of 400 ml of water, 0.4 g of the dyestuff obtained according to Example 2a), in a finely divided form, 3.4 g of a mixture of o-, m- and p-cresotic acid methyl ester and 0.6 g of a mixture of equal parts of an anionic dispersing agent and a non-ionic polyglycol ether, after addition of sulphuric acid until the pH value is 4.5; the material is then rinsed and dried. A deep violet dyeing which has very good fastness to light and to sublimation is obtained.

If the procedure indicated above is followed but a dyestuff obtained according to Example 20 is employed, a deep red-violet dyeing of equally good fastness properties is obtained.

(b) 10 g of a polyethylene terephthalate rag are dyed for 2 hours at 120° – 130° C in a liquor of pH 4.5 consisting of 400 ml of water and 0.4 g of the dyestuff of Example 2a), in a very finely divided form, as well as 0.3 g of a mixture of equal parts of an anionic dispersing agent and a non-ionic polyglycol ether. After rinsing and drying, a dyeing which is largely identical to that obtained according to a) is obtained.

(c) If cellulose triacetate is treated according to one of the instructions given in a) or b), violet dyeings are again obtained.

(d) A fabric of polyethylene glycol terephthalate fibres is impregnated on a padder with a liquor which contains, in 1,000 ml 20 g of the dyestuff mixture of Example 4a, in a finely divided form, and 10 g of a polyether, known from Belgian Patent Specification 615,102, as a thermosol auxiliary.

The fabric is then squeezed out to a weight increase of 70% and dried in a suspension jet drier or in a drying cabinet at 80° – 120° C. The fabric is then treated in a stenter frame or in a nozzle hot-flue with hot air at 100° – 200° C for approx. 45 seconds and is thereafter rinsed, optionally subjected to a reductive after-treatment, and dried. The reductive after-treatment for removing dyestuff remnants superficially adhering to the fibres can be carried out by introducing the fabric into a liquor at 25° C which contains 3–5 cm³ of sodium hydroxide of 38° C Be/liter and 1–2 g of (concentrated) hydrosulphite/liter, heating the liquor to 70° C over the course of approx. 15 minutes and leaving it at 70° C for a further 10 minutes. The fabric is then rinsed hot and dried. A violet dyeing is obtained, which is distinguished by good fastness to light, thermofixing, rubbing and washing. A very similar dyeing is obtained if instead of polyethylene terephthalate fibres polyester fibres of 1,4-bis-hydroxy-methylcyclohexane and terephthalic acid are used.

(e) A previously cleaned and heat-set fabric of polyethylene terephthalate fibres is printed with a printing paste which consists of the following components: 40 g of a mixture of 1-[o-(p)hydroxy-ethoxy-anilino]-6(7)-nitro-anthraquinone, 475 g of water, 465 g of crystal gum (1:2) and 20 g of sulphonated castor oil. Instead of crystal gum, an alginate thickener can also be used. To fix the dyestuff, the printed and dried goods are run at 190° – 200° C over a high throughput stenter frame or through a condensing apparatus. The duration of treatment is about 30 – 60 seconds. The resulting fixed print is then rinsed cold, soaped with 1 – 2 g of anionic detergent/liter at 80° – 80° C for approx. 10 minutes, rinsed first hot and then cold, and dried. A print resembling the dyeing of d) and distinguished by the same good fastness properties is obtained.

(f) If a cellulose triacetate fabric is padded as in d) and then treated with hot air as described there, but at 220° C, a somewhat bluer dyeing of equally good fastness properties is obtained.

EXAMPLE 25

(a) 100 g of a fabric of texturised polyethylene terephthalate fibres are introduced, without prior cleaning, into a dye bath at room temperature, which has been prepared from 2 g of the dyestuff obtained according to Example 2a) and 1,000 g of tetrachloroethylene. The bath is heated to 115° C over the couse of 10 minutes, with vigorous circulation of the liquor, and is kept for 30 minutes at this temperature. The liquor is then separated off and the dyed material is rinsed for 5 minutes with fresh solvent at about 40° C. After separating off the rinsing liquor, the dyed material is centrifuged and dried in a stream of air. A bluish-tinged ruby-coloured dyeing having very good fastness to sublimation and good fastness to washing and rubbing is obtained.

An equivalent dyeing was obtained in the same manner on a fabric of polycyclohexane-dimethylene terephthalate fibres.

If the tetrachloroethylene is replaced by the same quantity of 1,1,2-trichloroethane, an equivalent dyeing is obtained.

(b) 100 g of cellulose acetate filament yarn are introduced at room temperature into a dye bath which has been prepared from 1 g of the dyestuff used under a), 1,000 g of tetrachloroethylene, 1.5 g of oleic acid ethanolamide, 1.5 g of oleyl alcohol heptaethylene glycol ether and 6 ml of water. The bath is warmed to 78° C over the course of 20 minutes and kept at this temperature for 45 minutes.

After removing the dyeing liquor and rinsing with fresh tetrachloroethylene, the dyed yarn is freed of adhering solvent by suction filtration and drying in a stream of air. A bluish-tinged ruby-coloured dyeing is obtained.

(c) If the procedure indicated in Example 25a and b is followed but the dyestuff used there is replaced by a dyestuff mixture consisting of 1-(p-hydroxy-anilino)-5-, -b 6-, -7- and -8-nitro-anthraquinone, obtained according to Example 23, a bluish-tinged ruby-coloured dyeing with very good fastness to sublimation and good fastness to washing and rubbing is obtained.

We claim:

1. Anthraquinone compound of the formula

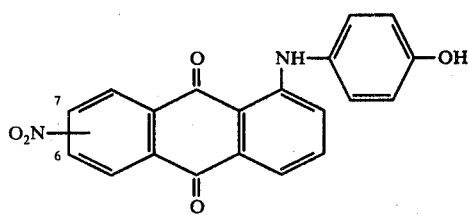

2. Anthraquinone compound of claim 1 of the formula:

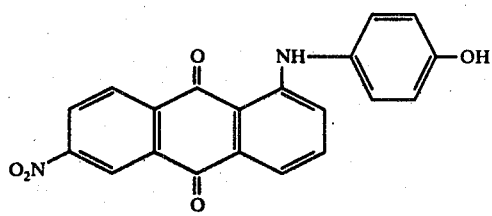

3. Anthraquinone compound of claim 1 of the formula:

* * * * *